July 4, 1950  L. D. MILLIGAN  2,513,580
BROILER
Filed Feb. 8, 1946  2 Sheets-Sheet 1
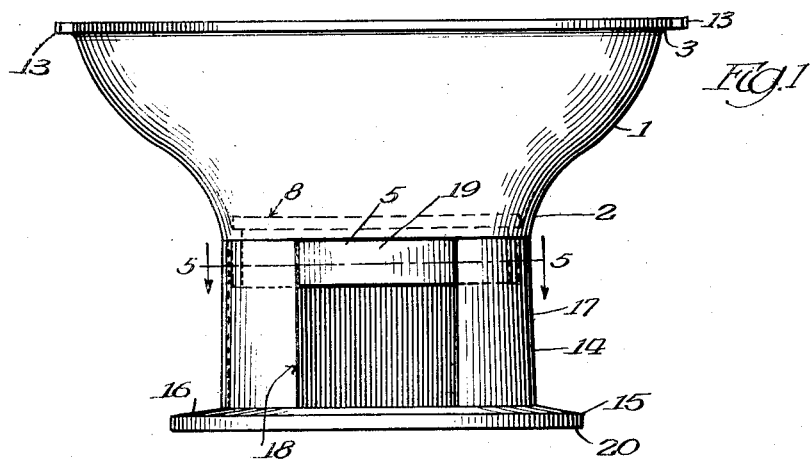
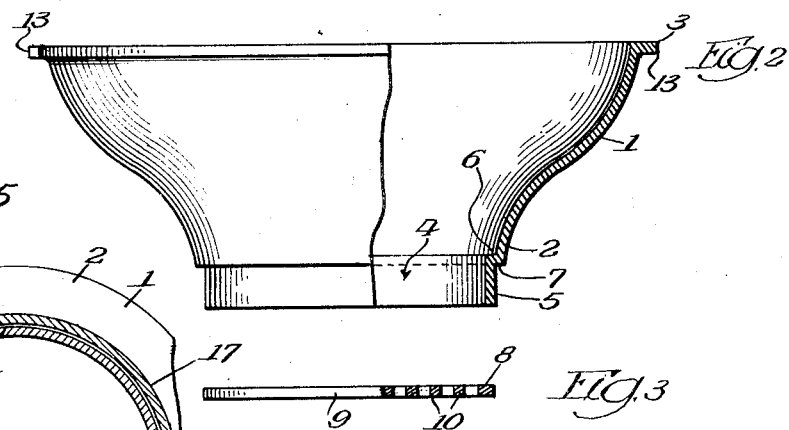
Inventor
Lawrence D. Milligan
By Spencer, Marzall, Johnston & Cook,
Attys

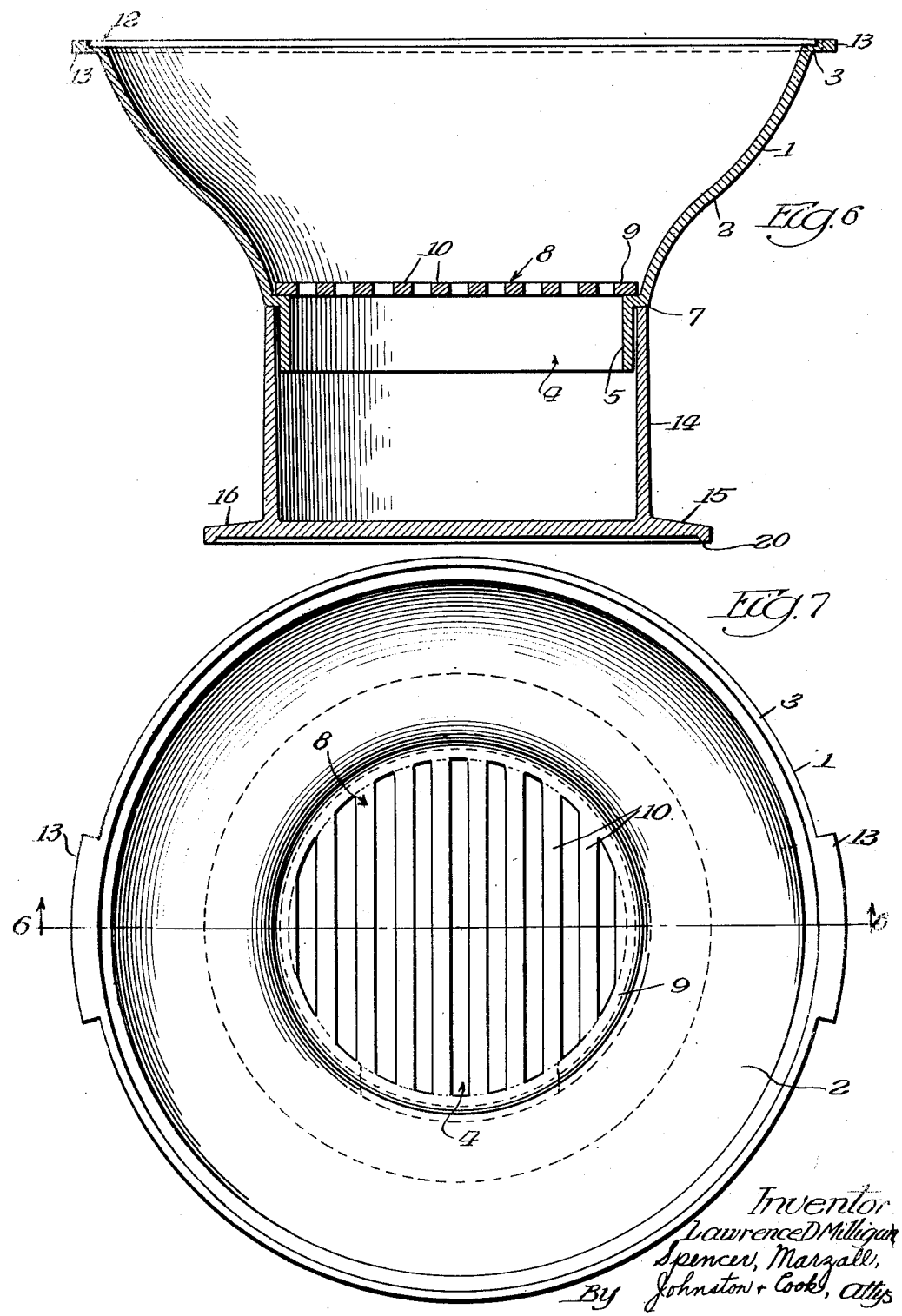

Patented July 4, 1950

2,513,580

UNITED STATES PATENT OFFICE 2,513,580

BROILER

Lawrence D. Milligan, Lake Forest, Ill.

Application February 8, 1946, Serial No. 646,448

2 Claims. (Cl. 126—25)

The invention relates to a broiler for broiling steaks, chops and other articles, and for toasting other materials and substances.

The primary object of the invention is the provision of a new and improved broiler configurated and constructed in a predetermined manner so as to provide the necessary and proper draft in the firepot so that the substances to be broiled may be broiled quickly and evenly, and the fire in the firepot will be given the proper draft so as to cause quick ignition of the combustible material, such as charcoal, there being proper combustion in the firepot or combustion chamber so as to overcome undue smoking and to permit quick and even burning of the combustible material.

Another important object of the invention is the provision of a broiler made in a plurality of sections so that the device may be readily and easily assembled and at the same time permit the parts to be packed together in a relatively small package for shipping and storage purposes.

A further object resides in the provision of a broiler element comprising an upper or broiler part, and a lower or ash pit part, the upper part being the firepot or bowl made in the form of an inverted bell, while the lower part or ash pit part of the broiler is made to taper upwardly from a larger lower diameter to an upper smaller diameter.

A further object of the invention is the provision of a relatively small portable broiler which may be moved easily from place to place, the broiler being made with demountable interfitting parts to permit easy and ready mobility, storage and packing.

Still another object of the invention resides in the construction and arrangement of parts and the particular formation and configuration of the various elements constituting the broiler whereby a highly efficient broiler is produced to effect quick ignition and to assure proper combustion, the heat generated during operation being concentrated outwardly so as to provide for the correct distribution of clean heat suitably deflected to broil the substance properly.

A still further object of the invention is the provision of a broiler comprising a plurality of parts properly interfitting or nesting, the broiler being of a relatively small size to make it adaptable not only for outside use but also capable of being put in the normal fireplace in a home and still have the necessary qualities to insure proper broiling.

Numerous other objects and advantages will appear through the progress of the specification which follows.

The accompanying drawings illustrate a selected embodiment of the invention and the views therein are as follows:

Fig. 1 is a detail front elevational view of the improved broiler;

Fig. 2 is a detail elevational view, partly in section, of the firepot or bowl, and embodying the invention;

Fig. 3 is a detail and elevational view, partly in section, of the grate which is adapted to be received removably in the firepot or bowl;

Fig. 4 is a detail elevational view of the lower part or ash pit of the broiler;

Fig. 5 is a detail transverse sectional view on the line 5—5 of Fig. 1;

Fig. 6 is a vertical sectional view of the improved broiler, the view being taken on the line 6—6 of Fig. 7; and Fig. 7 is a top plan view of the broiler constituting the invention.

The particular broiler herein shown for the purpose of illustrating the invention comprises an upper bowl or fire pot 1 in the form of an inverted bell. The inverted bell-shaped firepot flares outwardly from a lower extremity 2 in a reverse curve formation, sectionally, to the upper peripheral annular edge or flange 3, Figs. 2 and 6. The firepot 1 is hollow and has an open bottom 4 defined by a tubular or cylindrical neck 5. The neck is offset inwardly as clearly shown in Figs. 2 and 6 to provide an annular inwardly extending flange or ledge 6. A lower part of the flange or ledge 6, where the neck 5 joins the body of the firepot, provides an annular flange or supporting ledge 7 to support the firepot in elevated position. A circular grate 8 is positioned removably inside of the firepot and rests on top of the supporting ledge 6. The grate comprises outer annular ring 9, Fig. 6, to which spaced grate bars 10 are integrally connected.

The upper part of the bowl or firepot 1 terminates in the outer annular flange 3 to support a grill (not shown) upon which the substance to be broiled may be placed. The grill may rest on top of the annular flange, and it may be circular in configuration, being nested in an annular recess 12, indicated by dotted lines in Fig. 6. Projections 13 may be formed on the sides of the upper periphery 11 so as to provide handles for the bowl or pot 1.

The neck 5 of the bowl or firepot 1 is of a diameter less than the inner diameter of the pot so as to provide the annular supporting flange or ledge 7 so that the bowl may rest upon a lower structure or ash pit 14, Fig. 4, as clearly shown in Fig. 6.

The lower part of the broiler or the ash pit part 14 has a lower or base part 15 in the form of an annular ring 16 so as to support the ash pit 14 above the ground or other support upon which the broiler may be placed. A circular enclosing wall 17 is integrally connected to the base 15 and is relatively cylindrical in form. However, the body tapers from a relatively larger diameter at the bottom to a somewhat smaller diameter at the top. The top or upper end of the ash pit is slightly larger than the external diameter of the neck 5 so that the neck of the bowl or pot 1 will fit down into the ash pit 14. The ash pit tapers as shown in Figs. 1, 4 and 6, and has interengagement with the firepot or bowl 1. The front of the ash pit 14 is provided with an opening or cut-out 18 which is preferably rectangular, Fig. 4; although, of course, it may be made in any other suitable shape, provided its design and size are such as to provide sufficient and proper draft to effect proper ignition and combustion of the fuel in the firepot. The ash pit, therefore, comprises a completely cylindrical member tapering inwardly from bottom to top, but having a closed bottom with an opening provided in the wall to provide the necessary draft to the firepot.

The opening 18 extends from the base of the ash pit part to the extreme upper end as shown in Fig. 4. This opening, which is in the form of a relatively wide slot, is adapted to be partially closed by the neck of the firepot. The neck has an extension or projection 19 on its outer face, which projection extends downwardly into the slot or opening 18 a predetermined distance, thus reducing the finished draft opening to the proper size. The lug or projection 19 also positions the firepot with respect to the ash pit 14.

It is desirable that the broiler be used for either inside or outside broiling purposes and, therefore, is preferably made of a size or in sizes capable of being installed in the fireplace of a home. However, the device may be made any size suitable to perform the purpose intended and it is, therefore, desirable that devices larger or smaller in dimensions be made in proportion. In actual practice the broiler has the firepot part of about twelve and three-quarters inches in diameter; the height of the bowl from the bottom of the neck 5 to the top of the annular flange being substantially six inches. The distance from the bottom of the flange 7 to the bottom edge of the neck 5 is substantially one inch. The size of the opening 4, that is, the space between the inside edges of the annular flange 7 is approximately six and one-eighth inches. The walls of the firepot are preferably made three-sixteenths of an inch or less in thickness.

The ash pit 14 may have its enclosing side walls three-sixteenths of an inch or less in thickness, and is three and nine-sixteenths of an inch in height from the top of the base to the top edge of the enclosing wall 17. The base portion 15 of the ash pit is substantially nine inches in diameter. The opening 18 is three and one-half inches wide. The bottom of the opening 18 is flush with the upper surface of the base 15. The overall height of the broiler from the bottom of the ash pit to the top of the firepot is about nine inches. The lug or projection 19 is slightly less than the width of the opening 18 so as to fit neatly therein, Fig. 5, the lug 19 extending vertically the full height of the neck 5 as clearly shown in Fig. 1.

It is highly desirable that the firepot or bowl 1 be made as a separate and independent part instead of having the ash pit and the bowl constructed as a single, unitary element. The separation of the bowl 1 from the ash pit 14 and the removability of the grate 8 from the bowl enables easy packing, transportation and storage. The firepot is in the form of a reverse curve, and is so constructed as to reflect all heat to the food or substance on the grill. The bowl or firepot 1 comprises the neck 5 which merges into the curved walls of the firepot. The neck 5 constitutes a male member which has interfitting engagement within the periphery of the upper end of the ash pit 14. The separable construction of the bowl and the pit cuts down heat conductivity and, therefore, tends to prevent heating of the ash pit, keeping it cooler. Also, by making the broiler into the separable parts, the parts are permitted to cool faster during the construction of same to permit quicker handling and storage. The upper diameter of the ash pit is of a size to permit reception of the neck 5 on the bowl, but is small enough in diameter so as not to extend beyond the bowl 1. Therefore, the diameter of the ash pit at the upper end and at the inside thereof is sufficient to make a loose fit between the bowl and the ash pit. The bottom of the ash pit is of a slightly larger diameter than the upper end so that air may come in through the opening 18 and be deflected upwardly and concentrated at the opening where the grate is positioned.

The bowl or firepot 1 flares outwardly and upwardly from the neck 5 to the upper ring or flange 3. The walls of the bowl or firepot are reversely curved as clearly shown and are circumscribed about true radii. The base 15 is hollow underneath, Fig. 6, being spaced above the support by an annular flange 20, Figs. 1, 4 and 6.

The invention provides a broiler which is made in multiple pieces so that during construction the various pieces may be cooled more quickly to permit prompt handling and storage. Also, the construction is such that during use the heat in the bowl or firepot will not be conducted too rapidly to the ash pit, thereby maintaining the ash pit 14 cooler than the upper firepot or bowl 1. The multiple construction also permits the parts to be packed more readily and in nesting relationship so that the shipping package will occupy a relatively small amount of space. The broiler is made preferably of the dimensions indicated so that it may be used advantageously either as an outside broiler or as a broiler used indoors in the ordinary fireplace of the home. The formation, contour and design of the parts are so constructed and arranged that they may be cast or molded easily and quickly, and removed readily from the mold.

If desired, however, the device may be supported on a table or other structure to bring it to the convenient height, particularly for outdoor use.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A portable demountable broiler comprising an open top upper hollow inverted bell-shaped firepot body formed by an enclosing wall, said enclosing wall being reversely curved, a lower tubular hollow neck extending downwardly a predetermined distance from said firepot body, said neck being of a size considerably less than the size of said top opening of said firepot body, a grate supporting ledge outwardly of the neck to provide grate supporting means, a grate removably mounted on said means, a lower ash pit element located below the firepot and removably supporting the firepot, said ash pit element comprising a wall forming an open top in communication with the firepot and partially surrounding the neck thereof, there being an opening in the ash pit wall extending from the bottom of said latter wall to the top thereof to provide for draft to the firepot, a supporting ledge at the juncture of the neck and body to provide a support on the firepot to rest on the upper surface of the ash pit, a base for the ash pit to support said ash pit, a rim part on the firepot adapted to support a grill structure, projections on the upper peripheral end of the firepot, and a lug on the neck extending into said ash pit wall opening to reduce the vertical dimension of said latter opening and to position said firepot with respect to the ash pit.

2. A portable demountable broiler comprising an open top upper hollow firepot body formed by a reversely curved enclosing wall in the shape of an inverted bell, a hollow cylindrical neck at the lower end of the bell shaped enclosing wall, said neck being of a size considerably less than the size of said top opening of said firepot body, a ledge inwardly of the neck providing a grate support, a circular grate removably mounted on said support, a lower ash pit located below the firepot and removably supporting the firepot, said ash pit element comprising a wall forming an open top in communication with the firepot and partially surrounding the neck thereof, there being a vertically extending relatively wide opening in the ash pit wall to provide for draft to the firepot, a ledge at the exterior of the neck to provide a support on the firepot, said latter ledge resting on the upper surface of the ash pit, a base for the ash pit to support said ash pit, said partially enclosing wall of the ash pit having a cross-section increasing in area from top to bottom, and a lug on the neck receivable in the upper end of the opening in the ash pit wall to position the firepot and to reduce the height of the said latter opening.

LAWRENCE D. MILLIGAN.

REFERENCES CITED

The following references are of record in the file of this patent:

UNITED STATES PATENTS

| Number | Name | Date |
|---|---|---|
| 40,207 | Wright | Oct. 6, 1863 |
| 98,282 | Madison | Dec. 28, 1869 |
| 123,142 | Beckwith | Jan. 30, 1872 |
| 246,561 | Sassinat et al. | Aug. 30, 1881 |
| 422,899 | Adams et al. | Mar. 11, 1890 |
| 485,049 | Marcee | Oct. 25, 1892 |
| 657,758 | Coulston | Sept. 11, 1900 |
| 788,200 | Finch | Apr. 25, 1905 |
| 1,042,273 | Roe | Oct. 22, 1912 |
| 1,128,634 | Talbot | Feb. 16, 1915 |